(12) United States Patent
Tsuboi et al.

(10) Patent No.: US 10,453,596 B2
(45) Date of Patent: Oct. 22, 2019

(54) FERRITE POWDER FOR BONDED MAGNETS, METHOD FOR PRODUCING THE SAME AND FERRITE BONDED MAGNET

(71) Applicants: DOWA ELECTRONICS MATERIALS CO., LTD., Tokyo (JP); DOWA F-TEC CO., LTD., Kume-gun, Okayama (JP)

(72) Inventors: Satoru Tsuboi, Kume-gun (JP); Yasunobu Mishima, Kume-gun (JP); Keisuke Ayabe, Kume-gun (JP); Masayasu Senda, Kume-gun (JP)

(73) Assignees: DOWA ELECTRONICS MATERIALS CO., LTD., Tokyo (JP); DOWA F-TEC CO., LTD., Kume-gun, Okayama (JP)

( * ) Notice: Subject to any disclaimer, the term of this patent is extended or adjusted under 35 U.S.C. 154(b) by 314 days.

(21) Appl. No.: 15/515,892

(22) PCT Filed: Sep. 30, 2015

(86) PCT No.: PCT/JP2015/077874
§ 371 (c)(1),
(2) Date: Mar. 30, 2017

(87) PCT Pub. No.: WO2016/052677
PCT Pub. Date: Apr. 7, 2016

(65) Prior Publication Data
US 2017/0316857 A1 Nov. 2, 2017

(30) Foreign Application Priority Data

Sep. 30, 2014 (JP) ................................ 2014-202601
Sep. 30, 2015 (JP) ................................ 2015-193724

(51) Int. Cl.
| | |
|---|---|
| *H01F 1/113* | (2006.01) |
| *H01F 1/11* | (2006.01) |
| *C04B 35/26* | (2006.01) |
| *C04B 35/626* | (2006.01) |
| *C04B 35/634* | (2006.01) |
| *C01G 49/00* | (2006.01) |
| *H01F 41/02* | (2006.01) |

(52) U.S. Cl.
CPC .......... *H01F 1/113* (2013.01); *C01G 49/0036* (2013.01); *C04B 35/2683* (2013.01); *C04B 35/6261* (2013.01); *C04B 35/62675* (2013.01); *C04B 35/62695* (2013.01); *C04B 35/63468* (2013.01); *H01F 1/11* (2013.01); *H01F 41/0266* (2013.01); *C01P 2004/51* (2013.01); *C01P 2004/61* (2013.01); *C01P 2004/62* (2013.01); *C01P 2006/11* (2013.01); *C01P 2006/12* (2013.01); *C01P 2006/42* (2013.01); *C04B 2235/3201* (2013.01); *C04B 2235/3213* (2013.01); *C04B 2235/3274* (2013.01); *C04B 2235/5436* (2013.01); *C04B 2235/96* (2013.01)

(58) Field of Classification Search
CPC ........ H01F 1/113; H01F 1/11; H01F 41/0266; C01P 2004/51; C01P 2004/61; C01P 2004/62; C01P 2006/11; C01P 2006/12; C01P 2006/42; C01G 49/0036; C04B 35/2683; C04B 35/7661; C04B 35/62675
See application file for complete search history.

(56) References Cited

U.S. PATENT DOCUMENTS

| | | | |
|---|---|---|---|
| 8,741,170 B2* | 6/2014 | Fujii ................. | C01G 49/0036 |
| | | | 252/62.54 |
| 2012/0015189 A1* | 1/2012 | Suenaga ............ | C01G 49/0018 |
| | | | 428/402 |

FOREIGN PATENT DOCUMENTS

| | | |
|---|---|---|
| EP | 1475352 A2 | 11/2004 |
| EP | 2204352 A1 | 7/2010 |
| EP | 2418660 A1 | 2/2012 |
| JP | 3257936 * | 12/2001 |
| JP | 3257936 B2 | 2/2002 |
| JP | 2008-277792 A | 11/2008 |
| JP | 2010-263201 A | 11/2010 |

OTHER PUBLICATIONS

Nov. 24, 2015 International Search Report issued in International Patent Application No. PCT/JP2015/077874.
Nov. 24, 2015 Written Opinion issued in International Patent Application No. PCT/JP2015/077874.
May 14, 2018 Extended European Search Report issued in Patent Application No. 15847796.8.

* cited by examiner

*Primary Examiner* — C Melissa Koslow
(74) *Attorney, Agent, or Firm* — Oliff PLC (57) ABSTRACT

There is provided a ferrite powder for bonded magnets capable of producing ferrite bonded magnets with high $BH_{max}$, excellent in MFR when converted to a compound, with high p-iHc, wherein an average particle size of particles obtained by a dry laser diffraction measurement is 5 μm or less, a specific surface area is 1.90 m²/g or more and less than 3.00 m²/g, a compression density is 3.40 g/cm³ or more and less than 3.73 g/cm³, and a compressed molding has a coercive force of 2800 Oe or more and less than 3250 Oe.

9 Claims, 2 Drawing Sheets

FERRITE POWDER FOR BONDED MAGNETS, METHOD FOR PRODUCING THE SAME AND FERRITE BONDED MAGNET

TECHNICAL FIELD

The present invention relates to a ferrite powder for bonded magnets used for producing a bonded magnet and a method for producing the same, and a ferrite bonded magnet using the same.

DESCRIPTION OF RELATED ART

Ferrite sintered magnet (referred to as a "sintered magnet" in some cases in the present invention) is used for a magnet in which a high magnetic force is required. However, the sintered magnet involves inherent problems such that chipping or cracking occurs, with poor productivity because polishing is required, and processing into a complex shape is difficult. In recent years, there is a demand for replacing the sintered magnet with the ferrite bonded magnet (referred to as a "bonded magnet" in some cases in the present invention). However, when compared to the sintered magnet, a maximum energy product ($BH_{max}$) is poor in the bonded magnet, and therefore in order to replace the sintered magnet with the bonded magnet, property of $BH_{max}$ is requested to be improved in the bonded magnet.

Generally, $BH_{max}$ is determined by a residual magnetic flux density (Br) and a coercive force (Hc).

Here, Br is expressed by the following formula 1, in which density of magnet is indicated by ($\rho$), a saturation magnetization of a magnetic powder is indicated by ($\sigma s$), and an orientation is indicated by (Br/4$\pi$Is).

$$Br = 4\pi \times \rho \times \sigma s \times (\text{orientation}) \quad \text{Formula 1}$$

On the other hand, Hc is described by the theory of crystal anisotropy, shape anisotropy, and a single magnetic domain structure.

A typical difference between the sintered magnet and the bonded magnet is the value of $\rho$. $\rho$ of the sintered magnet is about 5.0 g/cm³. In contrast, it is a matter of course that density of the bonded magnet is lower than 5.0 g/cm³ because a binder such as resin and rubber is mixed into a kneaded material (compound) of a raw material in addition to a ferrite powder. Therefore, Br of the bonded magnet is decreased. Accordingly, in order to increase a magnetic force of the bonded magnet, the content (F.C.) of the ferrite powder in the compound is required to be increased.

However, when F.C. of the ferrite powder in the compound is increased, the viscosity of the compound becomes high during kneading of the ferrite powder and the binder, thus increasing a load and reducing the productivity of the compound, resulting in being unable to knead the ferrite powder and the compound in an extreme case. Then, even if the kneading can be performed, the value of fluidity (MFR) is low at the time of molding of the compound, thus reducing the productivity of the molding product, resulting in being unable to mold the compound in an extreme case.

In order to solve such a problem specific to the bonded magnet, the bonded magnet has been improved from a viewpoint of selection of the binder and surface treatment of the ferrite powder, etc. However, it is most important to guarantee high F.C. of the ferrite powder itself. F.C. of the ferrite powder is highly relevant to a particle size distribution and a compression density of ferrite particles constituting the ferrite powder.

As a method for producing such a ferrite powder for bonded magnets (referred to as "ferrite powder" in some cases in the present invention), an applicant discloses patent document 1.

In patent document 1, the applicant discloses the ferrite powder obtained by mixing the ferrite powder constituted of particles having a plurality of particle sizes. Therefore, in this ferrite powder, there are a plurality of peaks in a particle size distribution.

Further, when the value of a specific surface are (SSA) is high in the particles constituting the ferrite powder, resin (binder) amount adsorbed on the surfaces of the ferrite particles during kneading and molding, is increased, resulting in a reduction of the ratio of the resin that can be freely moved, and causing a reduction of fluidity, and the reducing of the fluidity further causing reduction of orientation during magnetic molding, namely, leading to reduction of Br. Therefore, SSA is set to 1.8 m²/g or less.

On the other hand, 2100 Oe or more coercive force (p-iHc) of a pressurized powder body (called "a compressed molding" hereafter) is realized.

Further, 55 emu/g or more saturation magnetization value as in a non-oriented state is realized.

PRIOR ART DOCUMENT

Patent Document

Patent document 1: Japanese Patent Laid Open Publication No. 2010-263201

SUMMARY OF THE INVENTION

Problem to be Solved by the Invention

According to patent document 1 disclosed by inventors of the present invention, ferrite powder with high compression density and high filling property can be obtained.

However, in recent years, a bonded magnet having a higher magnetic force is demanded in the market. As a result, the ferrite powder having higher p-iHc is demanded.

However, when the ferrite powder having p-iHc of 2750 Oe or more for example, is attempted to be obtained, dispersibility and MFR value of the ferrite particles are decreased, thus making it difficult to mold a molding product, and making it difficult to knead a pellet (for example, see patent document 1, and comparative examples 9 and 10).

Therefore, not a bonded magnet but a sintered magnet is used in a field in which a high magnetic force of about $BH_{max}$=2.5 to 4.0 MGOe is required. However, as described above, the sintered magnet involves a specific problem of generating chipping or cracking and requiring polishing, and therefore productivity is poor and processing into a complex shape is difficult.

On the other hand, in recent years, bonded magnets using rare earth magnets are used partially in this field. However, the rare earth magnet involves a problem that it is 20 times the cost of the ferrite magnet, and is easily rust.

Under such a circumstance, in the bonded magnet having good workability at a low cost, it is strongly requested to achieve higher $BH_{max}$ in applications of AV, OA equipment, small motors such as electrical components of automobiles and magnet rolls of copying machines.

In view of such a circumstance, the present invention is provided, and an object of the present invention is to provide a ferrite powder for bonded magnets capable of producing a ferrite bonded magnet having high $BH_{max}$, and excellent in fluidity when converted to a compound, and having a high p-iHc value, and a method for producing the same, and a ferrite bonded magnet using the ferrite powder for bonded magnets.

Means for Solving the Problem

In order to solve the above-described problem, strenuous efforts are made by inventors of the present invention, and it is found that in a producing step of the ferrite powder for bonded magnets, a mechanical pulverizing force is added on the ferrite powder in the stage of the producing step, and the values of an average particle size, a specific surface area (SSA), and a compression density (CD) of the produced ferrite powder for bonded magnets are set in a prescribed range, to thereby obtain the ferrite powder in which molding of the molding product is easy and kneading of the pellet is easy, while having p-iHc exceeding 2750 Oe. Thus, the present invention is completed.

Namely, a first invention for solving the abovementioned problem is a ferrite powder for bonded magnets, wherein
an average particle size of particles obtained by a dry laser diffraction measurement is 5 µm or less;
a specific surface area is 1.90 m$^2$/g or more and less than 3.00 m$^2$/g;
a compression density is 3.40 g/cm$^3$ or more and less than 3.73 g/cm$^3$, and
a compressed molding has a coercive force of 2800 Oe or more and less than 3250 Oe.

A second invention is the ferrite powder for bonded magnets wherein a cumulative distribution value at a particle size of 0.62 µm in a cumulative particle size distribution curve is 12% or more by volume.

A third invention is the ferrite powder for bonded magnets wherein a cumulative distribution value at a particle size of 0.74 µm in a cumulative particle size distribution curve is 17% or more by volume.

A fourth invention is the ferrite powder for bonded magnets wherein a frequency distribution at a particle size of 0.40 µm in a frequency distribution curve is 11 or more.

A fifth invention is the ferrite powder for bonded magnets wherein a frequency distribution at a particle size of 0.48 µm in a frequency distribution curve is 16 or more.

A sixth invention is the ferrite powder for bonded magnets according to any one of the first to fifth inventions, wherein when the ferrite powder for bonded magnets and nylon resin powder are kneaded to obtain a compound with 92.7 mass % content of the ferrite powder for bonded magnets, fluidity of the compound is 42.5 g/10 min or more.

A seventh invention is the ferrite powder for bonded magnets according to any one of the first to sixth inventions, wherein when the ferrite powder for bonded magnets and the nylon resin powder are kneaded to obtain the compound with 92.7 mass % content of the ferrite powder for bonded magnets and the compound is molded to obtain a bonded magnet, iHc of the bonded magnet is 2,200 Oe or more and less than 3,000 Oe.

An eighth invention is a ferrite bonded magnet produced by molding the ferrite powder for bonded magnets of any one of the first to seventh inventions.

A ninth invention is the ferrite bonded magnet containing the ferrite powder for bonded magnets of any one of the first to seventh inventions.

A tenth invention is a method for producing a ferrite powder for bonded magnets, including:
granulating a plurality of ferrite raw materials including iron oxide, and obtaining a first granulated material;
sintering the obtained first granulated material at a first temperature, and obtaining a coarse powder of a sintered product;
granulating a plurality of ferrite raw materials including iron oxide, and obtaining a second granulated material;
sintering the obtained second granulated material at a second temperature lower than the first temperature, and obtaining fine powder of the sintered product;
mixing the obtained coarse powder and fine powder, to obtain a mixed powder; and
adding a mechanical pulverizing force to the obtained mixed powder to obtain a pulverized mixture, and applying annealing to the obtained pulverized mixture,
wherein the first temperature is 1220° C. or more and less than 1250° C., and the second temperature is 900° C. or more and 1000° C. or less, and when a mixing ratio of the coarse powder and the fine powder is expressed by [mass of the coarse powder/mass of (coarse powder+ fine powder)]×100%, it is 56 mass % or more and less than 75 mass %.
Wherein, the mechanical pulverizing force is the force caused by a pulverization processing in which a vibration ball mill with a capacity of 2 to 4 L and power of 0.3 to 0.5 kW, is loaded with steel balls having a diameter of 8 to 14 mm as media, so that pulverization is performed at a rotation number of 1700 to 1900 rpm and an amplitude of 7 to 9 mm, for 20 to 100 minutes as a processing time, or the force equivalent thereto.

Advantage of the Invention

The ferrite powder for bonded magnets of the present invention has a high iHc value and a high MFR value, and therefore the bonded magnet having a high BH$_{max}$ can be produced.

DETAILED DESCRIPTION OF THE INVENTION

After extensive studies by inventors of the present invention regarding a configuration realizing a bonded magnet having a high magnetic force, a ferrite powder for bonded magnets is achieved, in which an average particle size obtained by a dry-type laser diffraction measurement is 5 µm or less, SSA is 1.90 m$^2$/g or more and less than 3.00 m$^2$/g, CD is 3.40 g/cm$^3$ or more and less than 3.73 g/cm$^3$, and p-iHc is 2800 Oe or more and less than 3250 Oe.

Then, it is found by the inventors of the present invention that the bonded magnet having a high magnetic force can be easily produced by a compound obtained by kneading and mixing the ferrite powder for bonded magnets of the present invention having the above configuration, and resin.

Further, after studies on a method for producing the ferrite powder for bonded magnets according to the present invention having the above configuration, it is found that by adding a mechanical pulverizing force to a powder in a stage of a producing step, thereby setting an average particle size, SSA, and CD of the produced ferrite powder for bonded magnets to values in a prescribed range, a ferrite powder can be obtained in which molding a molding product is easy, and kneading of a pellet is easy while Ph-iHc exceeds 2750 Oe. Thus, the present invention is completed.

The present invention will be described hereafter in an order of 1.) Ferrite powder of the present invention, 2.) Method for producing the ferrite powder of the present invention, 3.) Compound filled with the ferrite powder of the present invention, and 4.) Bonded magnet with the compound of the present invention molded.

1.) Ferrite Powder of the Present Invention

As described above, the ferrite powder of the present invention has a configuration in which an average particle size obtained by a dry-type laser diffraction measurement is 5 μm or less and 1 μm or more, SSA is 1.90 m$^2$/g or more and less than 3.00 m$^2$/g, CD is 3.40 g/cm$^3$ or more and less than 3.73 g/cm$^3$, and p-iHc is 2800 Oe or more and less than 3250 Oe.

Wherein each configuration and an effect thereof of (1) Average particle size, (2) SSA, (3) CD, (4) p-iHc, and (5) Residual magnetic flux density of a compressed molding in the ferrite powder, will be described.

(1) Average Particle Size

According to the ferrite powder of the present invention, an average particle size of particles is 5 μm or less and 1 μm or more obtained by the dry-type laser diffraction measurement. This is because when the average particle size is 5 μm or less, an orientation and a coercive force after bond magnetized, can be guaranteed. Further, this is because when the average particle size is 1 μm or more, a CD value can be guaranteed.

In a cumulative particle size distribution curve of the ferrite powder of the present invention, preferably a cumulative distribution value at a particle size 0.62 μm is 12 volume % or more, and a cumulative distribution value at a particle size 0.74 μm is 17 volume % or more.

In other words, preferably a frequency distribution at a particle size 0.40 μm is 11 or more and a frequency distribution at a particle size 0.48 μm is 16 or more in the particle size distribution curve.

This is because when ferrite and resin are mixed and kneaded, gaps between (coarse) ferrite particles can be filled with not only resin but also in a mixed state of resin and fine ferrite particles. As a result, high fluidity can be obtained even when a filling ratio of the ferrite is increased.

(2) Specific Surface Area (SSA)

It is found by the inventors of the present invention that SSA is preferably 1.90 m$^2$/g or more. Probably this is because mono-dispersion of particles constituting the ferrite powder is preferable for orientation, wherein the ferrite particles are mono-dispersed particles because SSA is 1.90 m$^2$/g or more.

On the other hand, since SSA is less than 3.00 m$^2$/g, the following situation can be prevented: resin (binder) amount adsorbed on surfaces on the particles constituting the ferrite powder during kneading and molding, is increased and the ratio of resin that can be freely moved is decreased accordingly, thus causing a reduction of fluidity. This tendency is remarkable when F.C. of the ferrite powder in the compound is high, and a magnetic field orientation during formation of the magnetic filed is low, and therefore it is found that SSA is preferably set to 1.90 m$^2$/g or more and less than 3.00 m$^2$/g.

As described above, the inventors of the present invention achieve the configuration in which SSA is 1.90 m$^2$/g or more and less than 3.00 m$^2$/g in the ferrite powder of the present invention.

(3) Compressed Density (CD)

CD is an index indicating how much filling of the ferrite particles is possible in a limited volume, the ferrite particles being a minimum constituent unit of the bonded magnet, and has a high correlation with a saturation magnetic flux density (Bs). On the other hand, in the case of a high CD, the volume of the gaps between particles becomes small, and therefore a resin amount that enters into the gaps of the ferrite powder is seemingly decreased in the compound obtained by mixing and kneading the ferrite powder and nylon-6 resin for example. Therefore, it is found that CD is preferably set to 3.40 g/cm$^3$ or more.

On the other hand, from a viewpoint of guaranteeing a high coercive force (inj-iHc) value of the bonded magnet (molding product) produced in a subsequent step, CD is preferably 3.73 g/cm$^3$ or less.

As described above, the inventors of the present invention realize the configuration in which CD is 3.40 g/cm$^3$ or more and less than 3.73 g/cm$^3$ in the ferrite powder for bonded magnets of the present invention.

(4) Coercive Force (p-iHc) of a Compressed Molding p-iHc is the coercive force of the ferrite powder for bonded magnets, in a state in which there is a history of a mechanical stress caused by being compressed under a high pressure of 2 tons/cm$^2$. "Ton" is the meaning of 1000 kg. Generally, during kneading and molding for producing the bonded magnet, the ferrite powder for bonded magnets is subjected to the mechanical stress, and therefore the coercive force is lower than that in a powder state to which the stress is not added.

Here, since there is a high correlation between p-iHc and the coercive force (inj-iHc) of the bonded magnet (molding product), the p-iHc value is an effective index for estimating the inj-iHc value. Accordingly, higher p-iHc is considered to be preferable, and from a viewpoint of previously considering low temperature demagnetization, it is found that a preferable configuration is that p-iHc is 2800 Oe or more.

On the other hand, in order to produce the bonded magnet, p-iHc is preferably less than 3250 Oe from a viewpoint of guaranteeing easiness of magnetization when the molded molding article is magnetized.

As described above, the inventors of the present invention realize the configuration in which p-iHc of the compressed molding using the ferrite powder for bonded magnets of the present invention, is 2800 Oe or more and less than 3250 Oe.

(5) Residual Magnetic Flux Density of the Compressed Molding (p-Br)

p-Br is a residual magnetic flux density of the ferrite powder for bonded magnets in a state in which there is a history of a mechanical stress caused by being compressed under a high pressure of 2 tons/cm$^2$.

As described above, the ferrite powder of the present invention has the configuration in which the average particle size obtained by the dry laser diffraction measurement is 5 μm or less, SSA is 1.90 m$^2$/g or more and less than 3.00 m$^2$/g, CD is 3.40 g/cm$^3$ or more and less than 3.73 g/cm$^3$, and p-iHc is 2800 Oe or more and less than 3250 Oe. With this configuration, by forming the ferrite powder, the bonded magnet having a high magnetic force of about BH$_{max}$=2.5 to 3.0 MGOe can be obtained.

There is a close interaction effects between SSA showing a surface property of each particle of the ferrite particles, and CD as a powder property of the ferrite powder for bonded magnets. Also, there is an influence on the magnetism depending on the orientation and a dispersion state of the ferrite particles, and therefore there is a close correlation between SSA, CD, and p-iHc, and it is important to satisfy the abovementioned configuration.

In the abovementioned configuration, since SSA of the ferrite particles is 1.9 m$^2$/g or more and less than 3.00 m$^2$/g, CD can be set to 3.40 g/cm$^3$ or more and less than 3.73 g/cm$^3$ in the ferrite powder for bonded magnets, and it is possible to obtain the bonded magnet which shows a high magnetic force of about BH$_{max}$=2.5 to 3.0 MGOe and high p-iHc of the ferrite particles in combination.

On the other hand, when p-iHc is 2800 Oe or more and less than 3250 Oe, the bonded magnet having BH$_{max}$=2.5 to 3.0 MGOe can be obtained. Such p-iHc is also formed by the orientation of the ferrite particles under an action of SSA and CD of the ferrite particles. In this case as well, there is a close correlation between SSA and CD.

2.) Method for Producing the Ferrite Powder of the Present Invention

A method for producing a ferrite powder for bonded magnets according to the present invention includes:

(1) granulating a plurality of ferrite raw materials including iron oxide, and obtaining a first granulated material;

(2) sintering the obtained first granulated material at a first temperature, and obtaining a coarse powder of a sintered product;

(3) granulating a plurality of ferrite raw materials including iron oxide, and obtaining a second granulated material;

(4) sintering the obtained second granulated material at a second temperature lower than the first temperature, and obtaining fine powder of the sintered product;

(5) mixing the obtained coarse powder and fine powder, to obtain a mixed powder; and (6) adding a mechanical pulverizing force to the obtained mixed powder to obtain a pulverized mixture, and applying annealing to the obtained pulverized mixture.

(1) The Step of Granulating a Plurality of Ferrite Raw Materials Including Iron Oxide, and Obtaining a First Granulated Material Iron oxide and strontium carbonate are weighed in a molar ratio of iron oxide:strontium carbonate=5.50 to 6.00:1.

0.10 to 3.0 mass % of flux (oxide, inorganic acid, or salt thereof) is added to the weighed material, and 1.00 to 5.00 mass % of chloride is added and mixed thereinto, to obtain a mixture. The mixture is granulated to obtain a particle with a diameter of about 3 to 10 mm, to thereby obtain the first granulated material.

Here, bismuth oxide, boric acid, borates, sulfates, phosphates, silica, and silicates, etc., can be preferably given as oxides, inorganic acids, or the salt thereof, and two kinds or more of them can be used in combination. KCl, NaCl, LiCl, RbCl, CsCl, BaCl$_2$, SrCl$_2$, CaCl$_2$, and MgCl$_2$, etc. can be preferably given as chlorides, and two kinds or more of them can be used in combination.

(2) The Step of Sintering the Obtained First Granulated Material at a First Temperature, and Obtaining a Coarse Powder of a Sintered Product The obtained first granulated material is sintered for 10 to 120 minutes at 1220 to 1250° C. under flowing atmosphere of the air, to thereby obtain a sintered product. Then pulverization processing is applied to the sintered product using a roller mill or a hammer mill, to thereby obtain a raw material coarse powder of coarse particles.

(3) The Step of Granulating a Plurality of Ferrite Raw Materials Including Iron Oxide, and Obtaining a Second Granulated Material Iron oxide and strontium carbonate are weighed and mixed in a molar ratio of iron oxide:strontium carbonate=5.20 to 6.00:1. After mixture, pulverization is performed to obtain particles having a diameter of about 3 to 10 mm.

(4) The Step of Sintering the Obtained Second Granulated Material at a Second Temperature Lower than the First Temperature, and Obtaining Fine Powder of the Sintered Product The obtained second granulated material is sintered for 30 to 120 minutes at 900° C. to 1000° C. which is a lower temperature than the first temperature under flowing atmosphere of air, to thereby obtain a sintered product. The sintered product is pulverized by the hammer mill, to thereby obtain a raw material coarse powder of fine particles.

(5) The Step of Mixing the Obtained Coarse Powder and Fine Powder

The raw material coarse powder of coarse particles (65 to 75 pts.wt.) obtained by the abovementioned (2), and the raw material coarse powder of fine particles (35 to 25 pts.wt.) obtained by the abovementioned (4) are weighed (at this time, the sum of the raw material coarse powder of coarse particles and the raw material coarse powder of fine particles is 100 pts.wt.). The obtained weighed product is injected into a wet grinder, and water is mixed therein as a solvent, then dispersion processing is applied thereto, to thereby obtain a slurry.

When the obtained coarse powder and the fine powder are mixed, a prescribed CD can be guaranteed in the bonded magnet obtained in the subsequent step if the mixing ratio of the coarse particles is 65 pts.wt. or more (the mixing ratio of the fine particles is 35 pts.wt. or less). On the other hand, if the mixing ratio of the coarse particles is less than 75 pts.wt. (the mixing ratio of the fine particles is 25 pts.wt. or more), a prescribed Hc can be obtained in the bonded magnet obtained in the subsequent step.

The obtained slurry is filtered or dehydrated to obtain a cake, and the cake is dried in the air to obtain a dried cake. Then, the dried cake is crushed, to thereby obtain a mixed powder.

(6) The Step of Adding a Mechanical Pulverizing Force to the Obtained Mixed Powder to Obtain a Pulverized Mixture, and Applying Annealing to the Obtained Pulverized Mixture A mechanical pulverizing force is added to the obtained mixed powder by crushing the dried cake. Specifically, the mechanical pulverizing force is the force caused by a pulverization processing in which a vibration ball mill with a capacity of 2 to 4 L, preferably 3 L, and power of 0.3 to 0.5 kW, preferably 0.4 kW, is loaded with steel balls having a diameter of 8 to 14 mm, preferably 12 mm as media, so that pulverization is performed at a rotation number of 1700 to 1900 rpm, preferably 1800 rpm and an amplitude of 7 to 9 mm, preferably 8 mm for 20 to 100 minutes as a processing time, or the force equivalent thereto. The vibration ball is preferably made of stainless steel. As a preferable specific example, Uras Vibrator KEC-8-YH by MURAKAMI SEIKI MFG. CO., LTD. can be given.

A grinder is not particularly specified regarding the type and whether it is a batch system or a continuous system, as long as it is the vibration ball mill by which a pulverization strength similar to above can be obtained.

For example by using a vibration mill as the vibration grinder, and applying dry-type pulverization to the obtained mixed powder for 20 minutes or more, the shapes of the particles of fine powder sintered at the second temperature (lower temperature) can be unexpectedly equalized. Then, the equalization of the particle shapes is considered to contribute to improvement of the fluidity of the ferrite powder or improvement of the fluidity of the compound. On the other hand, when the dry-type pulverization time is 100 minutes or less, crystal strain in the particles (coarse particles and fine particles) of the mixed powder caused by the pulverization is not excessive, thus making it easy to eliminate only the crystal strain in the subsequent step.

The dry-type pulverization may be the batch system or may be the continuous system. When the dry-type pulverization is performed by the continuous system, frequency, amplitude, supply amounts, and pulverization aids, etc., may be adjusted, to obtain the pulverization strength equivalent to that of the batch system.

After the mechanical pulverizing force is added to the mixed powder of the coarse powder and the fine powder, annealing is applied to the mixed powder at a temperature of 940 to 990° C. for 5 to 60 minutes, to thereby obtain the ferrite powder of the present invention.

3.) Compound Filled with the Ferrite Powder of the Present Invention

In order to achieve the high coercive force in the ferrite bonded magnet which is an original object of the invention, it is found by the inventors of the present invention that MFR value is critical in the compound which is the mixture of the ferrite powder and resin.

This is because the following problem is found by the inventors of the present invention: when F.C. of the ferrite powder in the compound is increased, MFR of the compound is decreased, resulting in deterioration of a molding performance when producing the magnet.

It is also found that high MFR value of 40 g/10 min or more can be obtained in the compound having high filling rate of F.C. 92.7 mass % for example, the compound being obtained by mixing and kneading the ferrite powder and nylon resin.

The step of producing the compound will be described hereafter.

The ferrite powder, a coupling agent, a lubricant, and resin are weighed, injected and mixed into a mixer, etc., to thereby obtain a mixture.

At this time, the ferrite powder is weighed so as to be a desired F.C. value. The coupling agent, for example, silane coupling agent is preferably weighed by about 0.5 to 1.0 mass %. As the lubricant, for example VPN-212P (manufactured by Henkel) can be preferably used, and about 0.5 to 1.0 mass % is weighed. As the resin, for example nylon-6, etc., can be preferably used.

The obtained mixture is heated so that the resin is heated and melted, and the mixture is kneaded to obtain the compound. It is convenient to knead the mixture in a prescribed size and form it into a pellet.

4.) Bonded Magnet Obtained by Molding the Compound of the Present Invention

By molding the compound of the present invention as described above, the molding product highly filled with the ferrite powder of the present invention can be easily obtained.

As a result, it is also found that the bonded magnet having a high magnetic force with $BH_{max}$ being the value of 2.4 MGOe or more can be easily produced.

It is also found that when the ferrite powder and the nylon resin powder are kneaded to obtain the compound in which content of the ferrite powder is 92.7 mass %, and when this compound is molded to obtain the bonded magnet, iHc of this bonded magnet shows 2,200 Oe or more and less than 3,000 Oe, and in the molding product highly filled with the ferrite powder as well, high iHc can be obtained.

The step of producing the bonded magnet will be described hereafter.

The kneaded pellet of a prescribe size is injected into an injection molding machine, and a molding product of a desired size is injection-molded at a prescribed temperature and under a molding pressure while applying a magnetic field, to thereby obtain the bonded magnet of the present invention.

The present invention is characterized in a manufacturing process as follows: a sintering temperature is set to be low during producing fine particles, and the dry-type pulverization is strengthened. By setting the sintering temperature to be low during production of the fine particles, the coercive force of the obtained magnetic powder can be increased. Further, by strengthening the dry-type pulverization, the shapes of the fine particles can be equalized, and as a result, the fluidity and the orientation of the compound can be high at the time of creating the bonded magnet, and as a result, both of the high $BH_{max}$ and high MFR can be obtained.

EXAMPLES

Example 1

1.) Production of the Ferrite Powder According to Example 1

(1) The Step of Granulating a Plurality of Ferrite Raw Materials Including Iron Oxide, and Obtaining a First Granulated Material Iron oxide and strontium carbonate were weighed in a molar ratio of iron oxide 5.87:strontium carbonate 1. 0.17 mass % of boric acid and 2.36 mass % of potassium chloride were added and mixed into the weighed material, and thereafter water was added thereto and the mixture was granulated into a spherical shape with a diameter of 3 to 10 mm, to thereby obtain a first granulated material.

(2) The Step of Sintering the Obtained First Granulated Material at a First Temperature, and Obtaining a Coarse Powder of the Sintered Product The granulated material was sintered at 1240° C. for 20 minutes under flowing atmosphere of air in a rotary kiln, to thereby obtain a sintered product. A bulk density of the sintered product was 1.6 g/cm³, and it was confirmed that there was almost no progress of sintering between particles.

Treatment was applied to the sintered product by a roller mill, to thereby obtain a coarse powder of the sintered product.

(3) The Step of Granulating a Plurality of Ferrite Raw Materials Including Iron Oxide, and Obtaining a Second Granulated Material Iron oxide and strontium carbonate were weighed in a molar ratio of iron oxide 5.5:strontium carbonate 1. Water was added thereto and the mixture was granulated into a spherical shape with a diameter of 3 to 10 mm, to thereby obtain a second granulated material.

(4) The Step of Sintering the Obtained Second Granulated Material at a Second Temperature Lower than the First Temperature, and Obtaining a Fine Powder of the Sintered Product The granulated material was sintered at 970° C. for 20 minutes under flowing atmosphere of air in a rotary kiln, to thereby obtain a sintered product. Treatment was applied to the sintered product by a roller mill, to thereby obtain a fine powder which is a sintered product.

(5) The Step of Mixing the Obtained Coarse Powder and the Fine Powder

The obtained coarse powder (70 pts.wt.), the obtained fine powder (30 pts.wt.), and tap water (150 pts.wt.) were weighed, and injected into a container having a stirring blade, and were stirred for 20 minutes and mixed, to thereby obtain a slurry in which particles of the coarse powder and the fine powder were dispersed. Then, the slurry was filtered and dried (at 150° for 10 hours in the air), to thereby obtain a dry cake. Pulverization treatment was applied to the dry cake, to thereby obtain a mixed powder.

(6) The Step of Adding a Mechanical Pulverizing Force to the Mixed Powder of the Coarse Powder and the Fine Powder and Further Applying Annealing Thereto The obtained mixed powder was pulverized by a vibration ball mill (Uras Vibrator KEC-8-YH by MURAKAMI SEIKI MFG. CO., LTD.). The pulverization processing was performed for 28 minutes under a pulverization processing condition of a rotation number: 1800 rpm, an amplitude: 8 mm, and using a steel ball with a diameter of 12 mm as media. The mixed powder to be pulverized was pulverized and annealed for 30 minutes at 950° C. in the air, to thereby obtain the ferrite powder of example 1.

The abovementioned production condition is described in table 1.

Figure 1A:
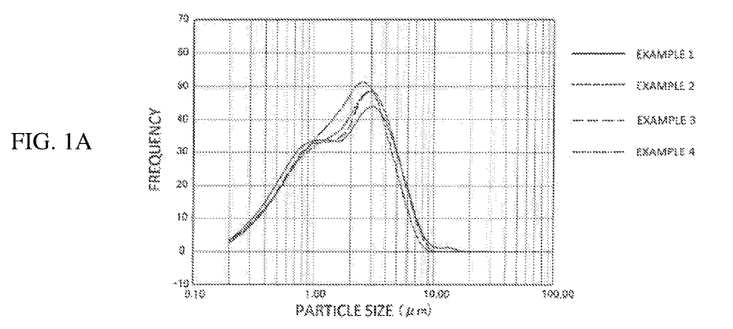
FIGS. 1A-1C are graphs showing particle diameter distribution curves of different ferrite powders, wherein the vertical axis indicates a frequency distribution and the horizontal axis indicates a particle size (µm).
Figure 2A:
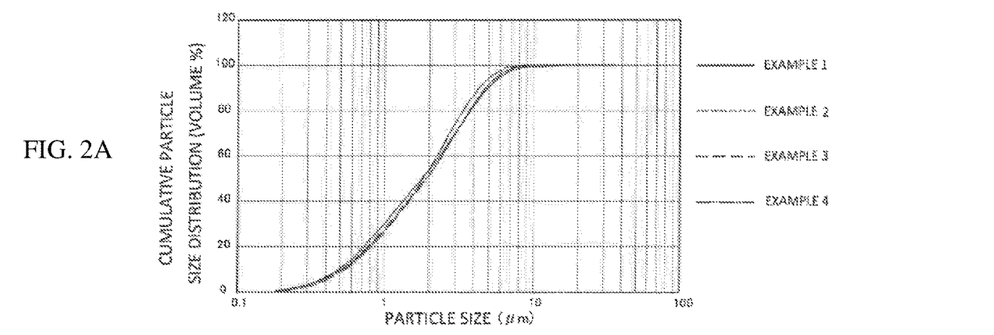
FIGS. 2A-2C are graphs showing cumulative particle size distribution curves of different ferrite powders, wherein the vertical axis indicates a cumulative particle size distribution (volume %) and the horizontal axis indicates the particle size (µm).

FIG. 1A shows a particle size distribution curve of the obtained ferrite powder of example 1, and FIG. 2A shows a cumulative particle size distribution curve thereof, respectively shown by solid lines. Wherein, it is confirmed that the particle size distribution curve has a two mountain-like peaks.

In the present invention, the particle size distribution curve indicates a frequency distribution curve obtained using a particle size distribution measurement device.

Further, in the examples and comparative examples of the present invention, a maximum value of the peak is not necessarily required to be a completely independent peak. Namely, when a shoulder is present in a skirt portion of the peak, the shoulder is considered to be another peak.

Table 2 shows the average particle size in the particles of the ferrite powder, peak particle sizes at two mountains (peak particle size (1) and peak particle size (2)), cumulative distribution value at particle size 0.62 μm in the cumulative particle size distribution curve, cumulative distribution value at particle size 0.74 μm in the cumulative particle size distribution curve, frequency distribution at particle size 0.40 μm and 0.48 μm in the frequency distribution curve, and values of SSA, CD, and p-iHc. Table 2 shows a residual magnetic flux density (p-Br) of a compressed molding, saturation magnetization (σs) of the ferrite powder, and coercive force (Hc) of the ferrite powder.

Then, from the values of table 2, it was confirmed that the ferrite powder of example 1 guaranteed the average particle size and the values of SSA, CD, and p-iHc.

2.) Production of the Green Compound (1) Production of Pellet with F.C. of 91.7 Mass %

The ferrite powder 91.7 pts.wt. of example 1, silane coupling agent 0.8 pts.wt., lubricant 0.8 pts.wt., and nylon-6 (powdery shape) 6.7 pts.wt. were weighed, injected and mixed into a mixer, to thereby obtain a mixture. The obtained mixture was kneaded at 230° C., to thereby obtain a kneaded pellet (1) with an average diameter of 2 mm as a pulverized product of the compound. A mass ratio (ferrite powder/nylon-6) in the pellet was 13.7.

In this case, table 3 shows the values of MFR of the kneaded pellet (1).

(2) Production of the Pellet with F.C. of 92.7 Mass %

The ferrite powder 92.7 pts.wt. of example 1, silane coupling agent 0.8 pts.wt., lubricant 0.8 pts.wt., and nylon-6 (powdery shape) 5.7 pts.wt. were weighed, injected and mixed into a mixer, to thereby obtain a mixture. The obtained mixture was kneaded at 230° C., to thereby obtain a kneaded pellet (2) with an average diameter of 2 mm as a pulverized product of the compound. A mass ratio (ferrite powder/nylon-6) in the pellet was 16.3.

In this case, table 3 shows the values of MFR of the kneaded pellet (2) of example 1.

3.) Molding of the Compound and Production of the Bonded Magnet (1) Production of the Bonded Magnet with F.C. of 91.7 Mass % and 4.3 kOe Orientation The obtained kneaded pellet (1) was injected into an injection-molding machine (by SUMITOMO Heavy Industries, Ltd.), and was injection-molded at a temperature of 290° C., with a molding pressure of 8.5 N/mm$^2$ in a magnetic field of 4.3 kOe, to thereby obtain the bonded magnet of example 1 (with F.C. of 91.7 mass % and 4.3 kOe orientation) with a columnar shape of diameter 15 mm×height 8 mm (an orientation direction of the magnetic field is a direction along a central axis of a column).

In this case, table 3 shows the values of Br, iHc (inj-iHc), and BH$_{max}$ of the bonded magnet (1) of example 1 (with F.C. of 91.7 mass % and 4.3 kOe orientation).

(2) Production of the Bonded Magnet with F.C. of 92.7 Mass % and 4.3 kOe Orientation Bonded magnet (2) of example 1 (with F.C. of 92.7 mass %. and 4.3 kOe orientation) was obtained by performing a similar operation other than the point that the kneaded pellet (2) of example 1 was used.

In this case, table 3 shows the values of Br, iHc (inj-iHc), and BH$_{max}$ of the bonded magnet (2) of example 1 (with F.C. of 92.7 mass %. and 4.3 kOe orientation).

(3) Production of the Bonded Magnet with F.C. of 92.7 Mass %. and 12 kOe Orientation Bonded magnet (3) of example 1 (with F.C. of 92.7 mass %. and 12 kOe orientation) was obtained by performing the similar operation other than the point that the kneaded pellet (2) of example 1 was used and the magnetic field during injection-molding was set to 12 kOe.

In this case, table 3 shows the values of Br, iHc (inj-iHc), and BH$_{max}$ of the bonded magnet (3) of example 1 (with F.C. of 92.7 mass %. and 12 kOe orientation).

4.) Measurement Method

Explanation will be given for a measurement method of each kind of property of the ferrite powder, pellet, and bonded magnet produced in example 1. The same thing can be said for examples 2 to 7 and comparative examples 1 to 5 described hereafter.

<Particle Size Distribution>

Regarding the particle size distribution of the ferrite powder, the particle size distribution on a volume basis can be measured under conditions of focal length=20 mm, a dispersion pressure: 5.0 bar, and a suction pressure: 130 mbar, using a dry laser diffraction particle size distribution measuring device (HELOS & RODLS by Japan Laser Corporation).

Further, three measurement points near the maximum value in the particle size distribution curve were approximated by a quadratic function, and a particle size which was the maximum value of the quadratic function was set as the peak particle size.

<Specific Surface Area (SSA)>

SSA of the ferrite powder was measured using a Monosorb manufactured by Yuasa Ionics Corporation, based on BET method.

<Compression Density (CD)>

Regarding CD of the ferrite powder, a cylindrical mold having an inner diameter of 2.54 cmϕ was filled with the ferrite powder 10 g, which was then compressed with a pressure of 1 ton/cm². The density of the ferrite powder at this time was used as CD for measuring the particle size distribution.

<Coercive Force (p-iHc) of the Compressed Molding> p-iHc of the ferrite powder was measured by the following procedure.

(1) The ferrite powder 8 g and polyester resin (P-resin by Japan Geoscience Corp.) 0.4 cc were kneaded in a mortar.

(2) The kneaded product 7 g was injected into a mold having an inner diameter of 15 mmϕ, which was then compressed for 40 seconds at a pressure of 2 tons/cm².

(3) A molding product was extracted from the mold and dried for 30 minutes at 150° C., and thereafter p-iHc of the ferrite powder was measured in a measurement magnetic field of 10 kOe by BH tracer (TRF-5BH manufactured by Toei Kogyo).

<Magnetic Property>

Magnetic properties of the ferrite powder were measured in the measurement magnetic field of 10 kOe, using VSM (VSMP-7-15 manufactured by Toei Industry Co., Ltd.), by injecting the ferrite powder 20 mg and paraffin 30 mg into a cell attached to an apparatus, which was then heated to 80° C. to melt the paraffin, and cooled to a room temperature, to thereby randomly solidify sample particles, and calculate σs (emu/g) and iHc (Oe). 1 Oe corresponds to $\frac{1}{4\pi} \times 10^3$ [A/m].

<Fluidity (MFR)>

MFR of the kneaded pellet was provided for a melt flow indexer ((melt flow indexer C-5059D2 (in conformity to JISK-7210) by Toyo Seiki Seisakusho), and MFR (unit g/10 min) was obtained by measuring a weight extruded with a load of 10 kg at 270° C. and converting it to an extrusion amount per 10 minutes.

In this specification, MFR is the value measured by the following procedures (1) to (3).

(1) The magnetic powder 91.7 pts.wt. to be measured, silane coupling agent 0.8 pts.wt., lubricant 0.8 pts.wt., and nylon-6 (powdery shape) 6.7 pts.wt., were stirred by a mixer.

(2) The obtained mixture was kneaded at 230° C., and formed into a pellet with an average diameter of 2 mm, as a crushed compound.

(3) The pellet obtained by above (2) was provided for the melt flow indexer, and the weight extruded in 10 minutes under the load of 10 kg at 270° C. was measured as MFR (unit g/10 min).

<Magnetic Properties of the Molding Product>

Magnetic properties of the molding product were evaluated by the following procedures.

(1) The kneaded pellet was injection-molded under molding pressure of 8.5 N/mm² at a temperature of 290° C. in the magnetic field of 4.3 kOe, using an injection molding machine (manufactured by Sumitomo Heavy Industries), to thereby obtain a columnar molding product with diameter 15 mm×height 8 mm (the orientation direction of the magnetic field is the direction along the central axis of the column).

(2) The magnetic properties of the columnar molding product were measured in a measurement magnetic field of 10 kOe by BH tracer (TRF-5BH manufactured by Toei Kogyo).

Example 2

1.) Production of the Mixed Powder (Ferrite Powder)

The ferrite powder of example 2 was obtained by performing the similar operation as example 1, other than the point that the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 21 minutes, and an annealing temperature as descried in this step was set to 980° C.

The abovementioned production conditions are described in table 1.

FIG. 1A shows the particle size distribution curve of the obtained ferrite powder of example 2, and FIG. 2A shows the cumulative particle size distribution curve thereof, respectively by short broken lines, wherein it was confirmed that the particle size distribution curves had two mountain-like peaks. The maximum value of the peak is not necessarily required to be a completely independent peak.

Table 2 shows the average particle size in the particles of the ferrite powder, the peak particle sizes at two mountains, the cumulative distribution value at particle size 0.62 μm in the cumulative particle size distribution curve, the cumulative distribution value at particle size 0.74 μm in the cumulative particle size distribution curve, the frequency distribution at particle size 0.40 μm and 0.48 μm in the frequency distribution curve, and the values of SSA, CD, σs, Hc, and p-iHc. From these values, it was confirmed that the average particle size and the values of SSA, CD, and p-iHc were secured.

2.) Production of the Compound (1) Production of the Pellet with F.C. of 91.7 Mass %.

Kneaded pellet (1) of example 2 was obtained by performing the similar operation as the kneaded pellet (1) of example 1, other than the point that the ferrite powder of example 2 was used.

In this case, table 3 shows the values of MFR of the kneaded pellet (1) of example 2.

(2) Production of the Pellet with F.C. of 92.7 Mass %.

Kneaded pellet (2) of example 2 was obtained by performing the similar operation as the kneaded pellet (2) of example 1, other than the point that the ferrite powder of example 2 was used.

In this case, table 3 shows the values of MFR of the kneaded pellet (2) of example 2.

3.) Molding of the Compound and Production of the Bonded Magnet (1) Production of the Bonded Magnet with F.C. of 91.7 Mass %. and 4.3 kOe Orientation Bonded magnet (1) of example 2 (with F.C. of 91.7 mass %. and 4.3 kOe orientation) was obtained by performing the similar operation as example 1, other than the point that the kneaded pellet (1) of example 2 was used.

In this case, table 3 shows the values of Br, iHc, and $BH_{max}$ of the bonded magnet (1) of example 2 (with F.C. of 91.7 mass %. and 4.3 kOe orientation).

(2) Production of the Bonded Magnet with F.C. of 92.7 Mass %. and 4.3 kOe Orientation Bonded magnet (2) of example 2 (with F.C. of 92.7 mass %. and 4.3 kOe orientation) was obtained by performing the similar operation as example 1, other than the point that the kneaded pellet (2) of example 2 was used.

In this case, table 3 shows the values of Br, iHc, and $BH_{max}$ of the bonded magnet (2) of example 2 (with F.C. of 92.7 mass %. and 4.3 kOe orientation).

(3) Production of the Bonded Magnet with F.C. of 92.7 Mass %. and 12 kOe Orientation Bonded magnet (3) of example 2 (with F.C. of 92.7 mass %. and 12 kOe orientation) was obtained by performing the similar operation as example 1, other than the point that the kneaded pellet (2) of example 2 was used.

In this case, table 3 shows the values of Br, iHc, and $BH_{max}$ of the bonded magnet (2) of example 2 (with F.C. of 92.7 mass %. and 12 kOe orientation).

Example 3

1.) Production of the Mixed Powder (Ferrite Powder)

The ferrite powder of example 3 was obtained by performing a similar operation as example 1, other than the point that the mixing ratio of the coarse powder and the fine powder as described in the step of "(5) mixing the obtained coarse powder and fine powder, to obtain a mixed powder" was set as the coarse powder (65 pts.wt.), and the fine powder (35 pts.wt.), and the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 21 minutes, and an annealing temperature as described in this step was set to 980° C.

The abovementioned production conditions are described in table 1.

FIG. 1A shows the particle size distribution curve of the obtained ferrite powder of example 3, and FIG. 2A shows the cumulative particle size distribution curve thereof, respectively by long broken lines, wherein it was confirmed that the particle size distribution curves had two mountain-like peaks. The maximum value of the peak is not necessarily required to be a completely independent peak.

Table 2 shows the average particle size in the particles of the ferrite powder, the peak particle sizes at two mountains, cumulative distribution value at particle size 0.62 μm in the cumulative particle size distribution curve, cumulative distribution value at particle size 0.74 μm in the cumulative particle size distribution curve, frequency distribution at particle size 0.40 μm and 0.48 μm in the frequency distribution curve, and values of SSA, CD, σs, Hc, and p-iHc. From these values, it was confirmed that the average particle size and the values of SSA, CD, and p-iHc were secured.

2.) Production of the Compound (1) Production of the Pellet with F.C. of 92.7 Mass %.

Kneaded pellet (2) of example 3 was obtained by performing the similar operation as the kneaded pellet (2) of example 1, other than the point that the ferrite powder of example 3 was used.

In this case, table 3 shows the values of MFR of the kneaded pellet (2) of example 3.

3.) Molding of the Compound and Production of the Bonded Magnet (1) Production of the Bonded Magnet with F.C. of 92.7 Mass %. and 4.3 kOe Orientation The bonded magnet (2) of example 3 (with F.C. of 92.7 mass %. and 4.3 kOe orientation) was obtained by performing the similar operation as example 1, other than the point that the kneaded pellet (2) of example 3 was used.

In this case, table 3 shows the values of Br, iHc, and $BH_{max}$ of the bonded magnet (2) of example 3 (with F.C. of 92.7 mass %. and 4.3 kOe orientation).

(2) Production of the Bonded Magnet with F.C. of 92.7 Mass %. and 12 kOe Orientation The bonded magnet (3) of example 3 (F.C. of 92.7 mass %. and 12 kOe orientation) was obtained by performing the similar operation as example 1, other than the point that the kneaded pellet (2) of example 3 was used.

In this case, table 3 shows the values of Br, iHc, and BHmax of the bonded magnet (3) of example 2 (with F.C. of 92.7 mass %. and 12 kOe orientation).

Example 4

1.) Production of the Mixed Powder (Ferrite Powder)

The ferrite powder of example 4 was obtained by performing the similar operation as example 1, other than the point that the first sintering temperature as described in the step of "sintering the obtained first granulated material at a first temperature, and obtaining a coarse powder of a sintered product" was set to 1220° C., and the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 21 minutes, and an annealing temperature as described in this step was set to 980° C.

The abovementioned production conditions are described in table 1.

FIG. 1A shows the particle size distribution curve of the obtained ferrite powder of example 4, and FIG. 2A shows the cumulative particle size curve, by two-dot chain line respectively, and it was confirmed that the particle size distribution curve had two mountain-like peaks. The maximum value of the peak is not necessarily required to be a completely independent peak.

Table 2 shows the average particle size in the particles of the ferrite powder, the peak particle sizes at two mountains, the cumulative distribution value at particle size 0.62 μm in the cumulative particle size distribution curve, the cumulative distribution value at particle size 0.74 μm in the cumulative particle size distribution curve, the frequency distribution at particle size 0.40 μm and 0.48 μm in the frequency distribution curve, and the values of SSA, CD, σs, Hc, and p-iHc. From these values, it was confirmed that the average particle size and the values of SSA, CD, and p-iHc were secured.

2.) Production of the Compound (1) Production of Pellet with F.C. of 92.7 Mass %.

Kneaded pellet (2) of example 2 was obtained by performing the similar operation as the kneaded pellet of example 1 other than the point that the ferrite powder of example 4 was used.

In this case, table 3 shows the values of MFR of the kneaded pellet (2) or example 4.

3) Molding of the Compound and Production of the Bonded Magnet (1) Production of the Bonded Magnet with F.C. of 92.7 Mass %. and 4.3 kOe Orientation The bonded magnet (2) of example 4 (with F.C. of 92.7 mass %. and 4.3 kOe orientation) was obtained by performing the similar operation as example 1, other than the point that the kneaded pellet (2) of example 4 was used.

In this case, table 3 shows the values of Br, iHc, and $BH_{max}$ of the bonded magnet (2) of example 4 (with F.C. of 92.7 mass %. and 4.3 kOe orientation).

(2) Production of the Bonded Magnet with F.C. of 92.7 Mass %. and 12 kOe Orientation The bonded magnet (3) of example 4 (with F.C. of 92.7 mass %. and 12 kOe orientation) was obtained by performing the similar operation as example 1, other than the point that the kneaded pellet (2) of example 4 was used.

In this case, table 3 shows the values of Br, iHc, and $BH_{max}$ of the bonded magnet (3) of example 4 (with F.C. of 92.7 mass %. and 12 kOe orientation).

Example 5

1.) Production of the Mixed Powder (Ferrite Powder)

The ferrite powder of example 5 was obtained by performing the similar operation as example 1, other than the point that the sintering temperature under flowing atmosphere of air in the rotary kiln as described in the step of "(4) sintering the obtained second granulated material at a second temperature lower than the first temperature, and obtaining fine powder of the sintered product" was set to 940° C., and the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 21 minutes, and the annealing temperature as described in this step was set to 980° C.

The abovementioned production condition is described in table 1.

Figure 1B:
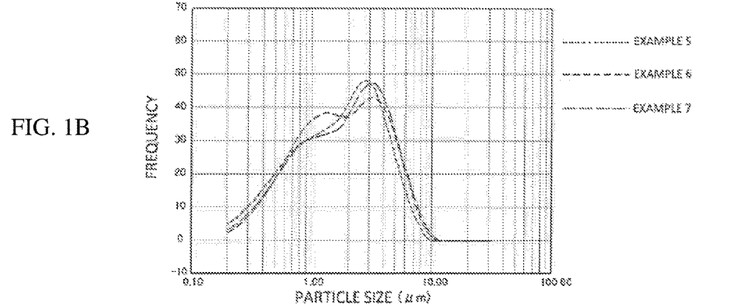
Figure 2B:
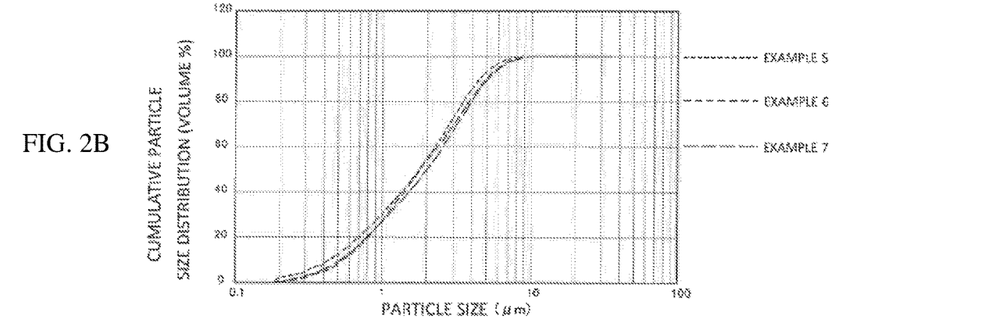

FIG. 1B shows the particle size distribution curve of the obtained ferrite powder of example 5, and FIG. 2B shows the cumulative particle size distribution curve thereof, respectively by short broken lines, wherein it was confirmed that the particle size distribution curves had two mountain-like peaks. The maximum value of the peak is not necessarily required to be a completely independent peak.

Table 2 shows the average particle size in the particles of the ferrite powder, the peak particle sizes at two mountains, the cumulative distribution value at particle size 0.62 μm in the cumulative particle size distribution curve, the cumulative distribution value at particle size 0.74 μm in the cumulative particle size distribution curve, the frequency distribution at particle size 0.40 μm and 0.48 μm in the frequency distribution curve, and the values of SSA, CD, σs, Hc, and p-iHc. From these values, it was confirmed that the average particle size and the values of SSA, CD, and p-iHc were secured.

2.) Production of the Compound (1) Production of the Pellet with F.C. of 92.7 Mass %.

Kneaded pellet (2) of example 5 was obtained by performing the similar operation as the kneaded pellet (2) of example 1, other than the point that the ferrite powder of example 5 was used.

In this case, table 3 shows the values of MFR of the kneaded pellet (2) of example 5.

3.) Molding of the Compound and Production of the Bonded Magnet (1) Production of the Bonded Magnet with F.C. of 92.7 Mass %. and 4.3 kOe Orientation Bonded magnet (2) of example 5 (with F.C. of 92.7 mass %. and 4.3 kOe orientation) was obtained by performing the similar operation as example 1, other than the point that the kneaded pellet (2) of example 5 was used.

In this case, table 3 shows the values of Br, iHc, and $BH_{max}$ of the bonded magnet (2) of example 5 (with F.C. of 92.7 mass %. and 4.3 kOe orientation).

(2) Production of the Bonded Magnet with F.C. of 92.7 Mass %. and 12 kOe Orientation Bonded magnet (3) of example 5 (with F.C. of 92.7 mass %. and 12 kOe orientation) was obtained by performing the similar operation other than the point that the kneaded pellet (2) of example 5 was used.

In this case, table 3 shows the values of Br, iHc, and $BH_{max}$ of the bonded magnet (3) of example 5 (with F.C. of 92.7 mass %. and 12 kOe orientation).

Example 6

1.) Production of the Mixed Powder (Ferrite Powder)

The ferrite powder of example 6 was obtained by performing the similar operation as example 1, other than the point that the mixing ratio of the coarse powder and the fine powder as described in the step of "(5) mixing the obtained coarse powder and fine powder, to obtain a mixed powder" was set as the coarse powder (73 pts.wt.), and the fine powder (27 pts.wt.), and the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 21 minutes, and an annealing temperature as described in this step was set to 980° C.

The abovementioned production conditions are described in table 1.

FIG. 1B shows the particle size distribution curve of the obtained ferrite powder of example 6, and FIG. 2B shows the cumulative particle size distribution curve thereof, respectively by broken lines, wherein it was confirmed that the particle size distribution curves had two mountain-like peaks.

Table 2 shows the average particle size in the particles of the ferrite powder, the peak particle sizes at two mountains, the cumulative distribution value at particle size 0.62 μm in the cumulative particle size distribution curve, the cumulative distribution value at particle size 0.74 μm in the cumulative particle size distribution curve, the frequency distribution at particle size 0.40 μm and 0.48 μm in the frequency distribution curve, and the values of SSA, CD, σs, Hc, and p-iHc. From these values, it was confirmed that the average particle size and the values of SSA, CD, and p-iHc were secured.

2.) Production of the Compound (1) Production of the Pellet with F.C. of 92.7 Mass %.

Kneaded pellet (2) of example 6 was obtained by performing the similar operation as the kneaded pellet (2) of example 1, other than the point that the ferrite powder of example 6 was used.

In this case, table 3 shows the values of MFR of the kneaded pellet (2) of example 6.

3.) Molding of the Compound and Production of the Bonded Magnet (1) Production of the Bonded Magnet with F.C. of 92.7 Mass %. and 4.3 kOe Orientation Bonded magnet (2) of example 6 (with F.C. of 92.7 mass %. and 4.3 kOe orientation) was obtained by performing the similar operation as example 1, other than the point that the kneaded pellet (2) of example 6 was used.

In this case, table 3 shows the values of Br, iHc, and $BH_{max}$ of the bonded magnet (2) of example 6 (with F.C. of 92.7 mass %. and 4.3 kOe orientation).

(3) Production of the Bonded Magnet with F.C. of 92.7 Mass %. and 12 kOe Orientation Bonded magnet (3) of example 6 (with F.C. of 92.7 mass %. and 12 kOe orientation) was obtained by performing the similar operation as example 1, other than the point that the kneaded pellet (2) of example 6 was used.

In this case, table 3 shows the values of Br, iHc, and $BH_{max}$ of the bonded magnet (3) of example 6 (with F.C. of 92.7 mass %. and 12 kOe orientation).

Example 7

1.) Production of the Mixed Powder (Ferrite Powder)

The ferrite powder of example 7 was obtained by performing the similar operation as example 1, other than the point that the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 21 minutes.

The abovementioned production conditions are described in table 1.

FIG. 1B shows the particle size distribution curve of the obtained ferrite powder of example 7, and FIG. 2B shows the cumulative particle size distribution curve thereof, respectively by long broken lines, wherein it was confirmed that the particle size distribution curves had two mountain-like peaks. The maximum value of the peak is not necessarily required to be a completely independent peak.

Table 2 shows the average particle size in the particles of the ferrite powder, peak particle sizes at two mountains, cumulative distribution value at particle size 0.62 μm in the cumulative particle size distribution curve, cumulative distribution value at particle size 0.74 μm in the cumulative particle size distribution curve, frequency distribution at particle size 0.40 μm and 0.48 μm in the frequency distribution curve, and values of SSA, CD, σs, Hc, and p-iHc. From these values, it was confirmed that the average particle size and the values of SSA, CD, and p-iHc were secured.

2.) Production of the Compound (1) Production of the Pellet with F.C. of 92.7 Mass %.

Kneaded pellet (2) of example 7 was obtained by performing the similar operation as the kneaded pellet (1) of example 1, other than the point that the ferrite powder of example 7 was used.

In this case, table 3 shows the values of MFR of the kneaded pellet (2) of example 7.

3.) Molding of the Compound and Production of the Bonded Magnet (1) Production of the Bonded Magnet with F.C. of 92.7 Mass %. and 4.3 kOe Orientation Bonded magnet (2) of example 7 (with F.C. of 92.7 mass %. and 4.3 kOe orientation) was obtained by performing the similar operation as example 1, other than the point that the kneaded pellet (2) of example 7 was used.

In this case, table 3 shows the values of Br, iHc, and $BH_{max}$ of the bonded magnet (2) of example 7 (with F.C. of 92.7 mass %. and 4.3 kOe orientation).

(2) Production of the Bonded Magnet with F.C. of 92.7 Mass %. and 12 kOe Orientation Bonded magnet (3) of example 7 (with F.C. of 92.7 mass %. and 12 kOe orientation) was obtained by performing the similar operation as example 1, other than the point that the kneaded pellet (2) of example 7 was used.

In this case, table 3 shows the values of Br, iHc, and $BH_{max}$ of the bonded magnet (3) of example 7 (with F.C. of 92.7 mass %. and 12 kOe orientation).

Comparative Example 1

1.) Production of the Mixed Powder (Ferrite Powder)

The ferrite powder of comparative example 1 was obtained by performing the similar operation as example 1, other than the point that the first sintering temperature as described in the step of "(2) sintering the obtained first granulated material at a first temperature, and obtaining a coarse powder of a sintered product" was set to 1235° C., and the sintering temperature under flowing atmosphere of air in a rotary kiln as described in the step of "(4) sintering the obtained second granulated material at a second temperature lower than the first temperature, and obtaining fine powder of the sintered product" was set to 1070° C., and the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 14 minutes, and an annealing temperature as described in this step was set to 910° C.

The abovementioned production conditions are described in table 1.

Figure 1C:
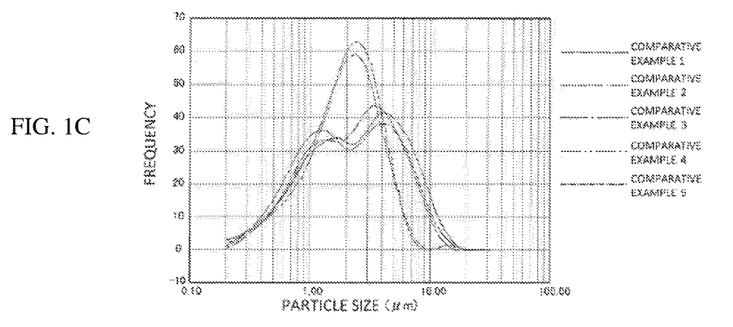
Figure 2C:
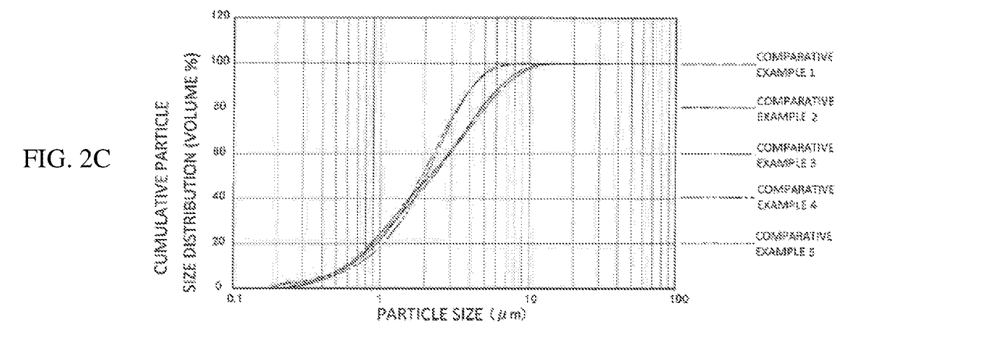

FIG. 1C shows the particle size distribution curve of the obtained ferrite powder of comparative example 1, and FIG. 2C shows the cumulative particle size curve thereof, by one-dot chain line respectively, and it was confirmed that the particle size distribution curve had two mountain-like peaks. Table 2 shows the average particle size in the particles of the ferrite powder, the peak particle sizes at two mountains, the cumulative distribution value at particle size 0.62 μm in the cumulative particle size distribution curve, the cumulative distribution value at particle size 0.74 μm in the cumulative particle size distribution curve, the frequency distribution at particle size 0.40 μm and 0.48 μm in the frequency distribution curve, and the values of SSA, CD, σs, Hc, and p-iHc.

2.) Production of the Compound (1) Production of the Pellet with F.C. of 91.7 Mass %.

Kneaded pellet (1) of comparative example 1 was obtained by performing the similar operation as the kneaded pellet (1) of example 1, other than the point that the ferrite powder of comparative example 1 was used.

In this case, table 3 shows the values of MFR of the kneaded pellet (1) of comparative example 1.

(2) Production of the Pellet with F.C. of 92.7 Mass %.

Kneaded pellet (2) of comparative example 1 was obtained by performing the similar operation as the kneaded pellet (2) of example 1, other than the point that the ferrite powder of comparative example 1 was used.

In this case, table 3 shows the values of MFR of the kneaded pellet (2) of comparative example 1.

3.) Molding of the Compound and Production of the Bonded Magnet (1) Production of the Bonded Magnet with F.C. of 91.7 Mass %. and 4.3 kOe Orientation Bonded magnet (1) of comparative example 1 (with F.C. of 91.7 mass %. and 4.3 kOe orientation) was obtained by performing the similar operation as example 1, other than the point that the kneaded pellet (1) of comparative example 1 was used.

In this case, table 3 shows the values of Br, iHc, and $BH_{max}$ of the bonded magnet (1) of comparative example 1 (with F.C. of 91.7 mass %. and 4.3 kOe orientation).

(2) Production of the Bonded Magnet with F.C. of 92.7 Mass %. and 4.3 kOe Orientation Bonded magnet (2) of comparative example 1 (with F.C. of 92.7 mass %. and 4.3 kOe orientation) was obtained by performing the similar operation as example 1 other than the point that the kneaded pellet (2) of comparative example 1 was used.

In this case, table 3 shows the values of Br, iHc, and $BH_{max}$ of the bonded magnet (2) of comparative example 1 (with F.C. of 92.7 mass %. and 4.3 kOe orientation).

Comparative Example 2

1.) Production of the Mixed Powder (Ferrite Powder)

The ferrite powder of comparative example 2 was obtained by performing the similar operation as example 1, other than the point that the first sintering temperature as described in the step of "(2) sintering the obtained first granulated material at a first temperature, and obtaining a coarse powder of a sintered product" was set to 1235° C., and the sintering temperature under flowing atmosphere of air in a rotary kiln as described in the step of "(4) sintering the obtained second granulated material at a second temperature lower than the first temperature, and obtaining fine powder of the sintered product" was set to 1070° C., and the pulverization processing time by the vibration ball mill for the obtained mixed powder as described in the step of "(6) adding a mechanical pulverizing force to the obtained mixed powder to obtain a pulverized mixture was set to 14 minutes, and an annealing temperature as describe in this step was set to 940° C.

The abovementioned production conditions are described in table 1.

FIG. 1C shows the particle size distribution curve of the obtained ferrite powder of comparative example 2, and FIG. 2C shows the cumulative particle size curve thereof, by two-dot chain line respectively, and it was confirmed that the particle size distribution curve had two mountain-like peaks. Table 2 shows the average particle size in the particles of the ferrite powder, the peak particle sizes at two mountains, the cumulative distribution value at particle size 0.62 μm in the cumulative particle size distribution curve, the cumulative distribution value at particle size 0.74 μm in the cumulative particle size distribution curve, the frequency distribution at particle size 0.40 μm and 0.48 μm in the frequency distribution curve, and the values of SSA, CD, σs, Hc, and p-iHc.

2.) Production of the Compound (1) Production of the Pellet with F.C. of 91.7 Mass %.

Kneaded pellet (1) of comparative example 2 was obtained by performing the similar operation as the kneaded pellet (1) of example 1, other than the point that the ferrite powder of comparative example 2 was used.

In this case, table 3 shows the values of MFR of the kneaded pellet (1) of comparative example 2.

(2) Production of the Pellet with F.C. of 92.7 Mass %.

Kneaded pellet (2) of comparative example 2 was obtained by performing the similar operation as the kneaded pellet (2) of example 1, other than the point that the ferrite powder of comparative example 2 was used.

In this case, table 3 shows the values of MFR of the kneaded pellet (2) of comparative example 2.

3.) Molding of the Compound and Production of the Bonded Magnet (1) Production of the Bonded Magnet with F.C. of 91.7 Mass %. and 4.3 kOe Orientation Bonded magnet (1) of comparative example 2 (with F.C. of 91.7 mass %. and 4.3 kOe orientation) was obtained by performing the similar operation as example 1, other than the point that the kneaded pellet (1) of comparative example 2 was used.

In this case, table 3 shows the values of Br, iHc, and $BH_{max}$ of the bonded magnet (1) of comparative example 2 (with F.C. of 91.7 mass %. and 4.3 kOe orientation).

(2) Production of the Bonded Magnet with F.C. of 92.7 Mass %. and 4.3 kOe Orientation Bonded magnet (2) of comparative example 2 (with F.C. of 92.7 mass %. and 4.3 kOe orientation) was obtained by performing the similar operation as example 1, other than the point that the kneaded pellet (2) of comparative example 2 was used.

In this case, table 3 shows the values of Br, iHc, and $BH_{max}$ of the bonded magnet (2) of comparative example 2 (with F.C. of 92.7 mass %. and 4.3 kOe orientation).

Comparative Example 3

1.) Production of the Mixed Powder (Ferrite Powder)

The ferrite powder of comparative example 3 was obtained by performing the similar operation as example 1, other than the point that the first sintering temperature as described in the step of "(2) sintering the obtained first granulated material at a first temperature, and obtaining a coarse powder of a sintered product" was set to 1280° C., and the sintering temperature under flowing atmosphere of air in a rotary kiln as described in the step of "(4) sintering the obtained second granulated material at a second temperature lower than the first temperature, and obtaining fine powder of the sintered product" was set to 1070° C., and the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 14 minutes, and an annealing temperature as described in this step was set to 965° C.

The abovementioned production conditions are described in table 1.

FIG. 1C shows the particle size distribution curve of the obtained ferrite powder of comparative example 3 by long one-dot chain line, and FIG. 2C shows the cumulative particle size curve thereof, by long one-dot chain line respectively, and it was confirmed that the particle size distribution curve had two mountain-like peaks. Table 2 shows the average particle size in the particles of the ferrite powder, the peak particle sizes at two mountains, the cumulative distribution value at particle size 0.62 μm in the cumulative particle size distribution curve, the cumulative distribution value at particle size 0.74 μm in the cumulative particle size distribution curve, the frequency distribution at particle size 0.40 μm and 0.48 μm in the frequency distribution curve, and the values of SSA, CD, σs, He, and p-iHc.

2.) Production of the Compound (1) Production of the Pellet with F.C. of 91.7 Mass %.

Kneaded pellet (1) of comparative example 3 was obtained by performing the similar operation as the kneaded pellet (1) of example 1, other than the point that the ferrite powder of comparative example 3 was used.

In this case, table 3 shows the values of MFR of the kneaded pellet (1) of comparative example 3.

(1) Production of the Pellet with F.C. of 92.7 Mass %.

Kneaded pellet (2) of comparative example 3 was obtained by performing the similar operation as the kneaded pellet (2) of example 1, other than the point that the ferrite powder of comparative example 3 was used.

In this case, table 3 shows the values of MFR of the kneaded pellet (2) of comparative example 3.

3.) Molding of the Compound and Production of the Bonded Magnet
(1) Production of the Bonded Magnet with F.C. of 91.7 Mass %. and 4.3 kOe Orientation Bonded magnet (1) of comparative example 3 (with F.C. of 91.7 mass %. and 4.3 kOe orientation) was obtained by performing the similar operation as example 1, other than the point that the kneaded pellet (1) of comparative example 3 was used.

In this case, table 3 shows the values of Br, iHc, and $BH_{max}$ of the bonded magnet (1) of comparative example 3 (with F.C. of 91.7 mass %. and 4.3 kOe orientation).

(2) Production of the Bonded Magnet with F.C. of 92.7 Mass %. and 4.3 kOe Orientation Bonded magnet (2) of comparative example 3 (with F.C. of 92.7 mass %. and 4.3 kOe orientation) was obtained by performing the similar operation as example 1, other than the point that the kneaded pellet (2) of comparative example 3 was used.

In this case, table 3 shows the values of Br, iHc, and $BH_{max}$ of the bonded magnet (2) of comparative example 3 (with F.C. of 92.7 mass %. and 4.3 kOe orientation).

(3) Production of the Bonded Magnet with F.C. of 92.7 Mass %. and 12 kOe Orientation Bonded magnet (3) of comparative example 3 (with F.C. of 92.7 mass %. and 12 kOe orientation) was obtained by performing the similar operation as example 1, other than the point that the kneaded pellet (2) of comparative example 3 was used.

In this case, table 3 shows the values of Br, iHc, and $BH_{max}$ of the bonded magnet (3) of comparative example 3 (with F.C. of 92.7 mass %. and 12 kOe orientation).

Comparative Example 4

1.) Production of the Mixed Powder (Ferrite Powder)

The ferrite powder of comparative example 4 was obtained by performing the similar operation as example 1, other than the point that the first sintering temperature as described in the step of "(2) sintering the obtained first granulated material at a first temperature, and obtaining a coarse powder of a sintered product" was set to 1210° C., and the sintering temperature under flowing atmosphere of air in a rotary kiln as described in the step of "(4) sintering the obtained second granulated material at a second temperature lower than the first temperature, and obtaining fine powder of the sintered product" was set to 1030° C., and the mixing ratio of the coarse powder and the fine powder as described in the step of "(5) mixing the obtained coarse powder and fine powder, to obtain a mixed powder" was set as the coarse powder (90 pts.wt.), and the fine powder (10 pts.wt.), and the pulverization processing time by the vibration ball mill for the obtained mixed powder as described in the step of "(6) adding a mechanical pulverizing force to the obtained mixed powder to obtain a pulverized mixture, and applying annealing to the obtained pulverized mixture" was set to 14 minutes, and an annealing temperature as described I this step was set to 960° C.

The abovementioned production conditions are described in table 1.

FIG. 1C shows the particle size distribution curve of the obtained ferrite powder of comparative example 4, and FIG. 2C shows the cumulative particle size curve thereof, by long two-dot chain line respectively, and it was confirmed that the particle size distribution curve had one mountain-like peaks. Table 2 shows the average particle size in the particles of the ferrite powder, the peak particle size at one mountain, the cumulative distribution value at particle size 0.62 μm in the cumulative particle size distribution curve, the cumulative distribution value at particle size 0.74 μm in the cumulative particle size distribution curve, the frequency distribution at particle size 0.40 μm and 0.48 μm in the frequency distribution curve, and the values of SSA, CD, σs, Hc, and p-iHc.

2.) Production of the Compound
(1) Production of the Pellet with F.C. of 91.7 Mass %.

Kneaded pellet (1) of comparative example 4 was obtained by performing the similar operation as the kneaded pellet (1) of example 1, other than the point that the ferrite powder of comparative example 4 was used.

In this case, table 3 shows the values of MFR of the kneaded pellet (1) of comparative example 4.

(1) Production of the Pellet with F.C. of 92.7 Mass %.

Even if the kneaded pellet (2) of comparative example 4 was attempted to be obtained by performing the similar operation as the kneaded pellet (2) of example 1 other than the point that the ferrite powder of comparative example 4 was used, kneading could not be performed.

3.) Molding of the Compound and Production of the Bonded Magnet
(1) Production of the Bonded Magnet with F.C. of 91.7 Mass %. and 4.3 kOe Orientation Bonded magnet (1) of comparative example 4 (with F.C. of 91.7 mass %. and 4.3 kOe orientation) was obtained by performing the similar operation as example 1, other than the point that the kneaded pellet (1) of comparative example 4 was used.

In this case, table 3 shows the values of Br, iHc, and $BH_{max}$ of the bonded magnet (1) of comparative example 4 (with F.C. of 91.7 mass %. and 4.3 kOe orientation).

Comparative Example 5

1.) Production of the Mixed Powder (Ferrite Powder)

The ferrite powder of comparative example 5 was obtained by performing the similar operation as example 1, other than the point that the sintering temperature as described in the step of "(2) sintering the obtained first granulated material at a first temperature, and obtaining a coarse powder of a sintered product" was set to 1210° C., and the sintering temperature under flowing atmosphere of air in a rotary kiln as described in the step of "(4) sintering the obtained second granulated material at a second temperature lower than the first temperature, and obtaining fine powder of the sintered product" was set to 1100° C., and the pulverization processing time by the vibration ball mill for the obtained mixed powder as described in the step of "(6) adding a mechanical pulverizing force to the obtained mixed powder to obtain a pulverized mixture was set to 14 minutes, and an annealing temperature as described in this step was set to 960° C.

The abovementioned production conditions are described in table 1.

FIG. 1C shows the particle size distribution curve of the obtained ferrite powder of comparative example 5, and FIG. 2C shows the cumulative particle size curve thereof, by short one-dot chain line respectively, and it was confirmed that the particle size distribution curve had one mountain-like peak. Table 2 shows the average particle size in the particles of the ferrite powder, the peak particle size at one mountain, the cumulative distribution value at particle size 0.62 μm in the cumulative particle size distribution curve, the cumulative distribution value at particle size 0.74 μm in the cumulative particle size distribution curve, the frequency distribution at particle size 0.40 µm and 0.48 µm in the frequency distribution curve, and the values of CD, σs, Hc, and p-iHc.

2.) Production of the Compound (1) Production of the Pellet with F.C. of 91.7 Mass %.

Kneaded pellet (1) of comparative example 5 was obtained by performing the similar operation as the kneaded pellet (1) of example 1, other than the point that the ferrite powder of comparative example 5 was used.

In this case, table 3 shows the values of MFR of the kneaded pellet (1) of comparative example 5.

(2) Production of the Pellet with F.C. of 92.7 Mass %.

Kneaded pellet (2) of comparative example 5 was attempted to be obtained by performing the similar operation as the kneaded pellet (2) of example 1, other than the point that the ferrite powder of comparative example 5 was used. However, it was impossible to perform kneading.

3.) Molding of the Compound and Production of the Bonded Magnet (1) Production of the Bonded Magnet with F.C. of 91.7 Mass %. and 4.3 kOe Orientation Bonded magnet (1) of comparative example 5 (with F.C. of 91.7 mass %. and 4.3 kOe orientation) was obtained by performing the similar operation as example 1, other than the point that the kneaded pellet (1) of comparative example 5 was used.

In this case, table 3 shows the values of Br, iHc, and $BH_{max}$ of the bonded magnet (1) of comparative example 5 (with F.C. of 91.7 mass %. and 4.3 kOe orientation).

CONCLUSION

The ferrite powder for bonded magnets of examples 1 to 7 realizes a small particle size of the coarse powder and the fine powder by controlling the sintering temperature for the ferrite powder, and obtains a high dispersibility by adding the mechanical pulverizing force to the mixed powder of the coarse powder and the fine powder for a long time, and therefore has SSA of 2.10 to 2.64 m$^2$/g, CD of 3.53 to 3.64 g/cm$^3$, and p-iHc of 2810 to 3140 Oe.

As a result, when the mixture of the ferrite powder for bonded magnets of examples 1 to 7 and resin is kneaded, the ferrite bonded magnet can be easily produced, with MFR being 102 to 146 g/10 min, and $BH_{max}$ being 2.43 to 2.50 MGOe in F.C. of 91.7 mass %. Also, the ferrite bonded magnet can be easily produced, with MFR being 42.5 to 85.8 g/10 min, and $BH_{max}$ being 2.29 to 2.54 MGOe.

| | F.C. 91.7 mass % + Nylon 6, 6.7 mass % | | | | F.C. 92.7 mass % + Nylon 6, 5.7 mass % | | | | | | |
|---|---|---|---|---|---|---|---|---|---|---|---|
| | Pellet (1) | Bonded magnet 4.3kOe orientation (1) | | | Pellet (2) | Bonded magnet 4.3kOe orientation (2) | | | Bonded magnet 12kOe orientation (3) | | |
| | MFR (g/10 min) | Br (G) | iHc (Oe) | BHmax (MGOe) | MFR (g/10 min) | Br (G) | iHc (Oe) | BHmax (MGOe) | Br (G) | iHc (Oe) | BHmax (MGOe) |
| Example 1 | 146 | 3197 | 2880 | 2.50 | 57.2 | 3232 | 2570 | 2.54 | 3359 | 2562 | 2.77 |
| Example 2 | 102 | 3153 | 2882 | 2.43 | 42.5 | 3166 | 2588 | 2.41 | 3317 | 2551 | 2.69 |
| Example 3 | — | — | — | — | 56.7 | 3184 | 2931 | 2.45 | 3290 | 2955 | 2.65 |
| Example 4 | — | — | — | — | 42.5 | 3213 | 2632 | 2.49 | 3347 | 2612 | 2.74 |
| Example 5 | — | — | — | — | 51.8 | 3088 | 2469 | 2.29 | 3266 | 2437 | 2.60 |
| Example 6 | — | — | — | — | 48.6 | 3181 | 2359 | 2.45 | 3308 | 2323 | 2.68 |
| Example 7 | — | — | — | — | 85.8 | 3163 | 2619 | 2.43 | 3246 | 2591 | 2.58 |
| Comparative example 1 | 116 | 3137 | 2196 | 2.39 | 25.3 | 3118 | 1952 | 2.27 | — | — | — |
| Comparative example 2 | 105 | 3142 | 2349 | 2.39 | 24.5 | 3125 | 2068 | 2.29 | — | — | — |
| Comparative example 3 | 115 | 3186 | 2211 | 2.46 | 39.3 | 3197 | 1927 | 2.39 | 3316 | 1890 | 2.61 |
| Comparative example 4 | 45 | 2866 | 3025 | 1.96 | Unable to knead | — | — | — | — | — | — |
| Comparative example 5 | 51 | 2849 | 3108 | 1.93 | Unable to knead | — | — | — | — | — | — |

| | Coarse powder | | | | | Fine powder | | | Mixed powder | | |
|---|---|---|---|---|---|---|---|---|---|---|---|
| | Composition | | | Sintering | | Composition | Sintering | | Coarse powder/ Fine powder Mixing ratio (Pts. wt.) | Dry-type pulvarization Time (Minute) | Annealing Temperature (° C.) |
| | Fe$_2$O$_3$/ SrCO$_3$ (Molar ratio) | Boric acid (Mass %) | KCl (Mass %) | Temperature (° C.) | Time (Minute) | Fe$_2$O$_3$/ SrCO$_3$ (Molar ratio) | Temperature (° C.) | Time (Minute) | | | |
| Example 1 | 5.87 | 0.17 | 2.36 | 1240 | 20 | 5.5 | 970 | 20 | 70/30 | 28 | 950 |
| Example 2 | 5.87 | 0.17 | 2.36 | 1240 | 20 | 5.5 | 970 | 20 | 70/30 | 21 | 980 |
| Example 3 | 5.87 | 0.17 | 2.36 | 1240 | 20 | 5.5 | 970 | 20 | 65/35 | 21 | 980 |
| Example 4 | 5.87 | 0.17 | 2.36 | 1220 | 20 | 5.5 | 970 | 20 | 70/30 | 21 | 980 |
| Example 5 | 5.87 | 0.17 | 2.36 | 1240 | 20 | 5.5 | 940 | 20 | 70/30 | 21 | 980 |
| Example 6 | 5.87 | 0.17 | 2.36 | 1240 | 20 | 5.5 | 970 | 20 | 73/27 | 21 | 980 |
| Example 7 | 5.87 | 0.17 | 2.36 | 1240 | 20 | 5.5 | 970 | 20 | 70/30 | 21 | 950 |
| Comparative example 1 | 5.87 | 0.17 | 2.36 | 1235 | 20 | 5.5 | 1070 | 20 | 70/30 | 14 | 910 |
| Comparative example 2 | 5.87 | 0.17 | 2.36 | 1235 | 20 | 5.5 | 1070 | 20 | 70/30 | 14 | 940 |
| Comparative example 3 | 5.87 | 0.17 | 2.36 | 1280 | 20 | 5.5 | 1070 | 20 | 70/30 | 14 | 965 |
| Comparative example 4 | 5.87 | 0.17 | 2.36 | 1210 | 20 | 5.5 | 1030 | 20 | 90/10 | 14 | 960 |

| | | | | | | | | | | |
|---|---|---|---|---|---|---|---|---|---|---|
| Comparative example 5 | 5.87 | 0.17 | 2.36 | 1210 | 20 | 5.5 | 1100 | 20 | 70/30 | 14 | 960 |

The invention claimed is:

1. A strontium ferrite powder for bonded magnets, wherein
    an average particle size of particles obtained by a dry laser diffraction measurement is 5 μm or less,
    a specific surface area is 1.90 m$^2$/g or more and less than 3.00 m$^2$/g,
    a compression density is 3.40 g/cm$^3$ or more and less than 3.73 g/cm$^3$,
    a compressed molding has a coercive force of 2800 Oe or more and less than 3250 Oe, and
    a cumulative distribution value at a particle size of 0.62 μm in a cumulative particle size distribution curve is 12% or more by volume.

2. The strontium ferrite powder for bonded magnets according to claim 1, wherein a cumulative distribution value at a particle size of 0.74 μm in a cumulative particle size distribution curve is 17% or more by volume.

3. The strontium ferrite powder for bonded magnets according to claim 1, wherein a frequency distribution at a particle size of 0.40 μm in a frequency distribution curve is 11 or more.

4. The strontium ferrite powder for bonded magnets according to claim 1, wherein a frequency distribution at a particle size of 0.48 μm in a frequency distribution curve is 16 or more.

5. The strontium ferrite powder for bonded magnets according to claim 1, wherein when the strontium ferrite powder for bonded magnets and a nylon resin powder are kneaded to obtain a compound with 92.7 mass % content of the strontium ferrite powder for bonded magnets, fluidity of the compound is 42.5 g/10 min or more.

6. The strontium ferrite powder for bonded magnets according to claim 1, wherein when the strontium ferrite powder for bonded magnets and a nylon resin powder are kneaded to obtain a compound with 92.7 mass % content of the strontium ferrite powder for bonded magnets and the compound is molded to obtain a bonded magnet, iHc of the bonded magnet is 2,200 Oe or more and less than 3,000 Oe.

7. A ferrite bonded magnet produced by molding the strontium ferrite powder for bonded magnets of claim 1.

8. The ferrite bonded magnet containing the strontium ferrite powder for bonded magnets of claim 1.

9. A method for producing a ferrite powder for bonded magnets, comprising:
    granulating a plurality of ferrite raw materials including iron oxide, and obtaining a first granulated material;
    sintering the obtained first granulated material at a first temperature, and obtaining a coarse powder of a sintered product;
    granulating a plurality of ferrite raw materials including iron oxide, and obtaining a second granulated material;
    sintering the obtained second granulated material at a second temperature lower than the first temperature, and obtaining fine powder of the sintered product;
    mixing the obtained coarse powder and fine powder, to obtain a mixed powder; and
    adding a mechanical pulverizing force to the obtained mixed powder to obtain a pulverized mixture, and applying annealing to the obtained pulverized mixture,
    wherein the first temperature is 1220° C. or more and less than 1250° C., and the second temperature is 900° C. or more and 1000° C. or less, and when a mixing ratio of the coarse powder and the fine powder is expressed by [mass of the coarse powder/mass of (coarse powder+ fine powder)]×100%, it is 56 mass % or more and less than 75 mass %,
    wherein the mechanical pulverizing force is the force caused by a pulverization processing in which a vibration ball mill with a capacity of 2 to 4 L and power of 0.3 to 0.5 kW, is loaded with steel balls having a diameter of 8 to 14 mm as media, so that pulverization is performed at a rotation number of 1700 to 1900 rpm and an amplitude of 7 to 9 mm, for 20 to 100 minutes as a processing time, or the force equivalent thereto.

\* \* \* \* \*